United States Patent
Rodrigues et al.

(10) Patent No.: US 9,346,718 B2
(45) Date of Patent: May 24, 2016

(54) METHOD FOR RECYCLING A BYPRODUCT OF THE PHOSPHATE FERTILIZER INDUSTRY, SOIL CONDITIONER, AND SOIL CONDITIONER MANUFACTURING PROCESS

(71) Applicant: VALE S.A., Rio de Janeiro (BR)

(72) Inventors: Sérgio Leite Rodrigues, São Paulo (BR); Luiz Roberto Guilherme, Lavras (BR); Silvio Júnio Ramos, Lavras (BR); Lucas Alberth Ribeiro Do Valle, Itumirim (MG); Hamilton Seron Pereira, Uberlândia (BR); Enio Tarso De Souza Costa, Monte Carmelo (BR); José Oswaldo Siqueira, Belém (BR)

(73) Assignee: VALE S.A., Rio de Janeiro (BR)

( * ) Notice: Subject to any disclaimer, the term of this patent is extended or adjusted under 35 U.S.C. 154(b) by 0 days.

(21) Appl. No.: 14/517,628

(22) Filed: Oct. 17, 2014

(65) Prior Publication Data

US 2016/0107942 A1    Apr. 21, 2016

(51) Int. Cl.
  *C05D 3/00*     (2006.01)
  *C05D 3/02*     (2006.01)
  *C01F 11/22*    (2006.01)
  *C05B 17/00*    (2006.01)
  *C05G 3/04*     (2006.01)

(52) U.S. Cl.
  CPC ................. *C05B 17/00* (2013.01); *C01F 11/22* (2013.01); *C05D 3/00* (2013.01); *C05D 3/02* (2013.01); *C05G 3/04* (2013.01)

(58) Field of Classification Search
  None
  See application file for complete search history.

(56) References Cited

U.S. PATENT DOCUMENTS

| | | | | |
|---|---|---|---|---|
| 2,914,474 A | * | 11/1959 | Hillyer | C02F 1/583 210/724 |
| 3,551,332 A | * | 12/1970 | Bird | C01F 11/22 210/724 |
| 3,755,532 A | * | 8/1973 | Harrison | C01F 7/54 423/116 |
| 3,842,161 A | * | 10/1974 | Hyoky | C01B 33/186 423/339 |
| 3,855,399 A | * | 12/1974 | Van Eiji | C01B 7/193 423/335 |
| 3,956,147 A | * | 5/1976 | Becker | C01B 9/08 423/19 |
| 4,539,187 A | * | 9/1985 | Russ | C01B 9/08 423/132 |
| 5,112,499 A | * | 5/1992 | Murray | C02F 1/5236 210/713 |
| 5,597,399 A | * | 1/1997 | Basu | C05D 3/00 71/9 |
| 5,910,297 A | * | 6/1999 | Cicha | C01F 11/22 423/332 |
| 2010/0150808 A1 | * | 6/2010 | Bhusarapu | B01J 8/0055 423/341 |

* cited by examiner

*Primary Examiner* — Wayne Langel
(74) *Attorney, Agent, or Firm* — Arent Fox LLP

(57) ABSTRACT

Industrial demand for hexafluorosilicic acid ($H_2SiF_6$) is often lower than the amount produced from fluoride recycling processes. One alternative for using this surplus is manufacturing a soil conditioner by neutralizing the hexafluorosilicic acid with calcium oxide (CaO) inside an open, Kullman type reactor. The reaction ensures alkalinity to the soil conditioner having a pH of about 10, moisture less than about 40%, phosphorus ($P_2O_5$) at about 2.5%, calcium at about 22%, about 0.5% magnesium, about 10% silicon (about 30% to 40% water-soluble), about 18% fluoride, neutralization power of about 5% to 15%, and total neutralization power of about 5% to 12%. The resulting product, called AgroSiCa, is easily manageable with very high contents of Ca and Si (total and soluble), and also contains Mg, P, Fe, Zn, and F. When applied to soil, it contributes to the supply of nutrients, provides a better root growth and improves the plants development.

12 Claims, 4 Drawing Sheets

METHOD FOR RECYCLING A BYPRODUCT OF THE PHOSPHATE FERTILIZER INDUSTRY, SOIL CONDITIONER, AND SOIL CONDITIONER MANUFACTURING PROCESS

FIELD OF THE INVENTION

The present invention relates to the manufacturing process of a soil conditioner that utilizes industrial waste as raw material. The invention also refers to a soil conditioner generated with a combination of industrial waste and a neutralizing substance. Finally, the invention also addresses a recycling method for a byproduct of the phosphate fertilizing industry.

BACKGROUND OF THE INVENTION

The process of phosphate rock acidulation with sulfuric acid or phosphoric acid (for the production of triple superphosphate, superphosphate, and phosphoric acid) produces hexafluorosilicic acid ($H_2SiF_6$) as byproduct. Although part of the production of this byproduct is sold to the industry, the production of this substance is always greater than the demand of the sector. Therefore, the industry producing phosphate fertilizers is presently looking for a new destination for $H_2SiF_6$, preferably a new commercial destination that can contribute to financial gains and at the same time promote the reduction of environmental impacts caused by the production of such waste.

Until presently, different alternatives for the allocation of $H_2SiF_6$ have been tried unsuccessfully, due to high costs and low quality of the finished product.

BRIEF SUMMARY OF THE INVENTION

Aspects of the invention include a soil conditioner manufacturing process that comprises a step of hexafluorosilicic acid ($H_2SiF_6$) neutralization with calcium oxide (CaO), wherein the neutralization occurs in a controlled way, being performed inside a reactor.

Aspects of the invention also include a recycling method for a byproduct of the phosphate fertilizer industry comprising the following steps:
  Byproduct neutralization with a neutralizing agent, originating a product, herein referred to as AgroSiCa; and
  Utilization of the resulting product—AgroSiCa, as soil conditioner.

BRIEF SUMMARY OF THE SEVERAL VIEWS OF DRAWINGS

Figure 1:
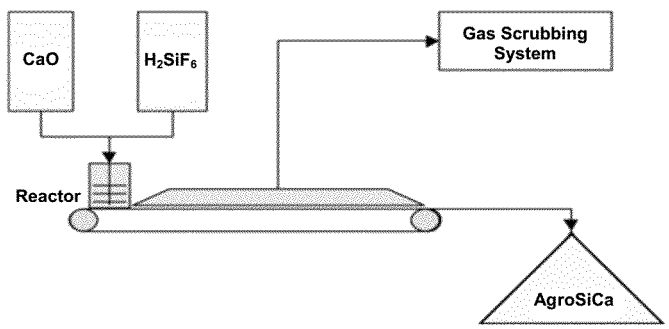

FIG. 1—Shows the concept for recycling a waste from the phosphate fertilizer industry (hexafluorosilicic acid—$H_2SiF_6$), which is mixed with calcium oxide for manufacturing a soil conditioner—herein referred to as AgroSiCa.

Figure 2:
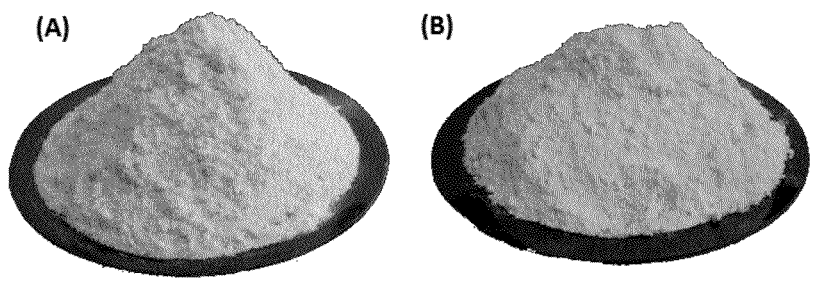
Figure 3:
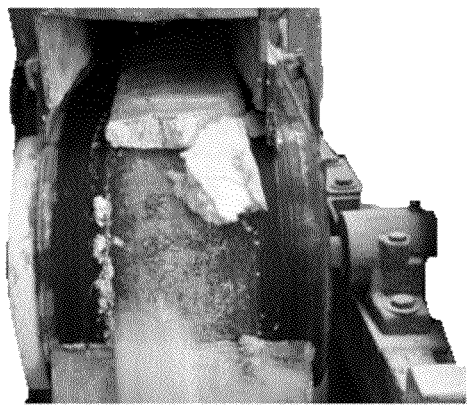
Figure 4:
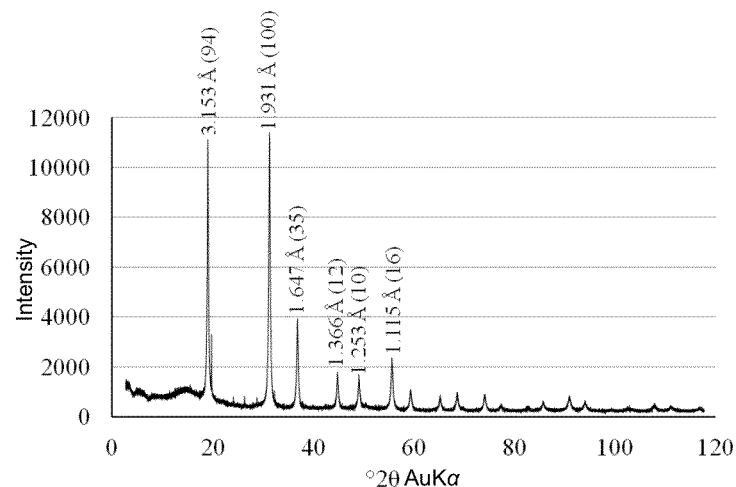
Figure 5:
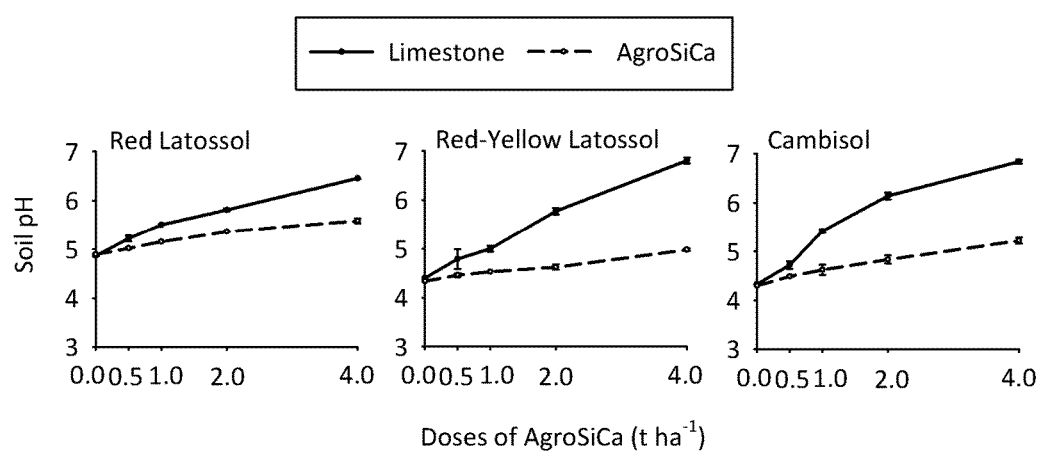
Figure 6:
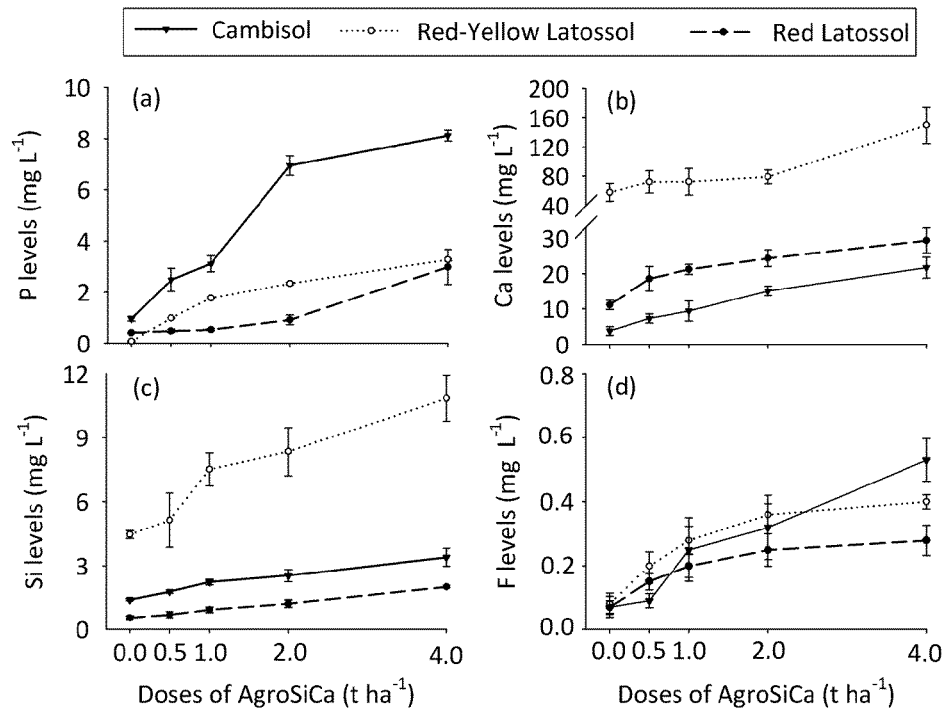

FIG. 2—Shows two frontal views of the first (A) and second (B) portion of AgroSiCa produced with hexafluorosilicic acid from different industrial plants;

FIG. 3—Shows the frontal view of the product AgroSiCa leaving a conveyor belt while carrying out the production process of the invention product;

FIG. 4—Shows the X-ray diffraction on the AgroSiCa sample analyzed in an X-ray diffractometer using synchrotron light source;

FIG. 5—Shows three charts exhibiting the increase of soil pH as a result of the application of equal quantities of limestone and AgroSiCa in three soils, after 40 days of incubation;

FIG. 6—Shows four charts exhibiting the increase in phosphorus (a), calcium (b), and silicon (c) concentrations in soil solution of three soils during the cultivation of maize and soybean, and fluoride levels in the leachates of three soils (d), after the maize cultivation.

Figure 7:
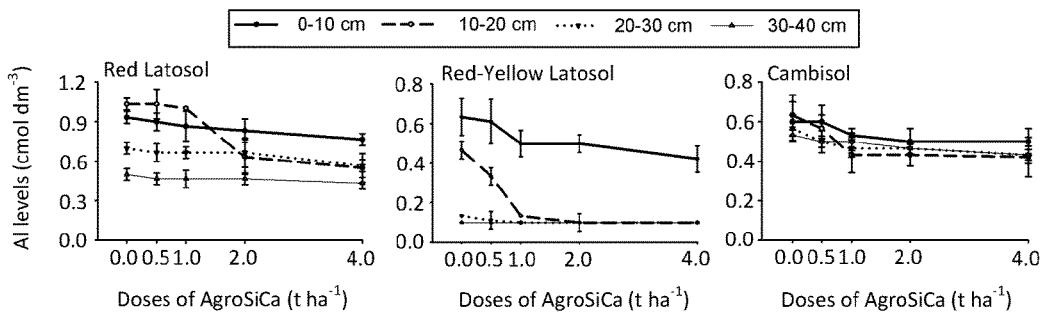

FIG. 7—Shows three charts exhibiting the Al concentration reduction in different layers of three soils, due to the doses of AgroSiCa and after the maize cultivation.

Figure 8:
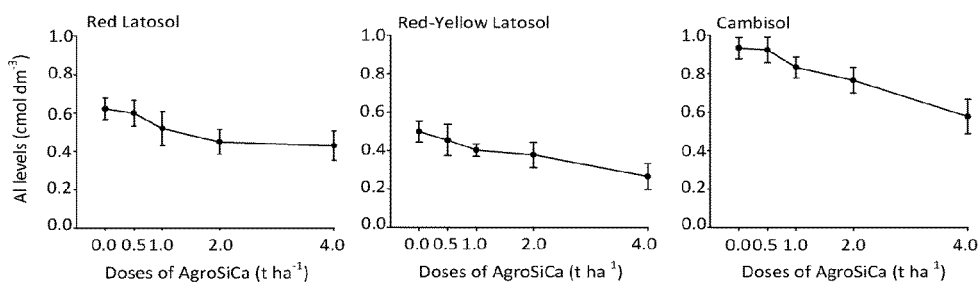

FIG. 8—Shows three charts exhibiting the Al concentration reduction in three soils, due to the doses of AgroSiCa and after the soybean cultivation.

Figure 9:
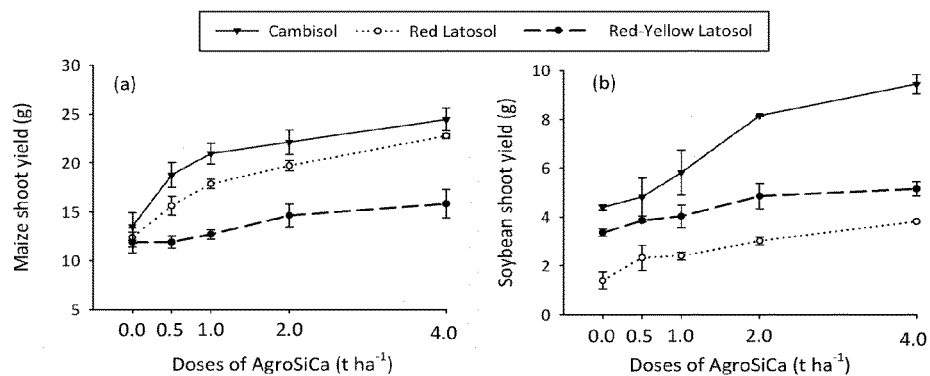
Figure 10:
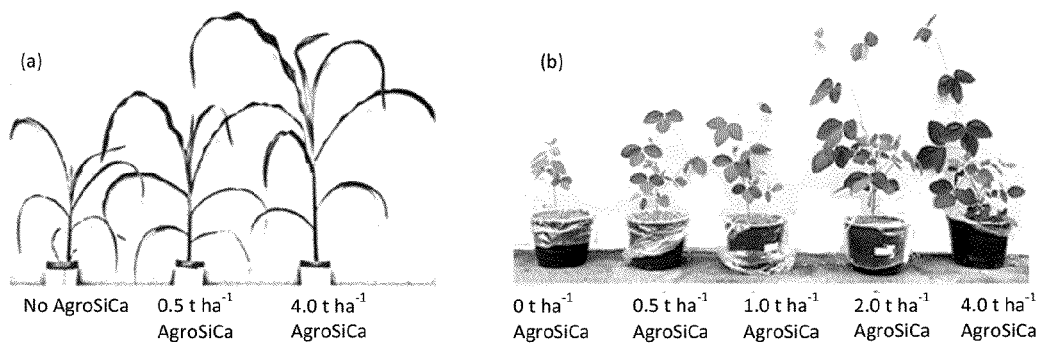

FIG. 9—Shows two charts that exhibit the shoot yield of maize after 60 days the cultivation (a) and of soybean after 45 days the cultivation (b), due to the doses of AgroSiCa in three soils;

FIG. 10—Shows the frontal view exhibiting the maize growth after 50 days of cultivation (a) and the soybean growth after 45 days of cultivation (b), due to the doses of AgroSiCa.

DETAILED DESCRIPTION OF THE INVENTION

The present invention comprises the process and the product obtained from the neutralization of hexafluorosilicic acid ($H_2SiF_6$) with calcium oxide (CaO), and the method for utilizing the product manufactured for agricultural purposes. The resulting product, referred to as AgroSiCa, presents favorable chemical properties in terms of elements that are essential for the soil improvement and plant growth.

The present invention has the following purposes:
Find a new purpose for hexafluorosilicic acid, as a byproduct of processes in the phosphate fertilizer industry;
Reduce the environmental impacts caused by the treatment and disposal of hexafluorosilicic acid;
Develop a neutralization process for hexafluorosilicic acid upon combination with calcium oxide (CaO);
Develop a product for agricultural use originated from the neutralization of hexafluorosilicic acid with CaO;
Develop a recycling method for a byproduct of the phosphate fertilizer industry. The process defined by the present invention consists in the reaction of hexafluorosilicic acid with calcium oxide, under certain conditions that confer alkalinity and easy handling to the finished product. Preferably, the hexafluorosilicic acid used in such reaction should consist of an aqueous substance, with a concentration exceeding 18%, preferably higher than 23%.

The reaction is completed inside an open, "Kullman" type reactor, where the calcium oxide is supplied at the same time with hexafluorosilicic acid into the reactor. The intense exothermal reaction originated from the combination of both substances produces sufficient heat for boiling the free water in the system. In the moment the water reaches its boiling point (no later than 5 seconds thereafter) the boiling mud is discharged onto a conveyor belt where the water vapor arising from such material is removed via an air inlet system. The concept for the production of AgroSiCa is shown in FIG. 1. The stoichiometry of the neutralization reaction of $H_2SiF_6$ with CaO is as follows:

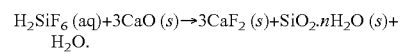
$$H_2SiF_6\ (aq) + 3CaO\ (s) \rightarrow 3CaF_2\ (s) + SiO_2 \cdot nH_2O\ (s) + H_2O.$$

An excess of CaO is necessary for ensuring the finished product alkalinity, so the pH of the reaction product should be within 7 and 12, and preferably between 9 and 11. Therefore, the reaction may also be represented as follows:

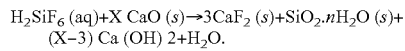

$H_2SiF_6$ (aq)+X CaO (s)→3$CaF_2$ (s)+$SiO_2$.$nH_2O$ (s)+ (X−3) Ca (OH) 2+$H_2O$.

At the end of the conveyor belt, the final moisture of the product is less than 40%, and preferably less than 30%. Note, however, that even at such moisture level, the finished product is perfectly manageable as a soil conditioner. If desirable, after passing through the reaction belt, the finished product may be dried, granulated, pelletized, turned into dust or bran, and mixed to one or more nutrients before being marketed.

The great agriculture potential use of AgroSiCa is mainly due to the presence of calcium (Ca) and silicon (Si) in its constitution, elements that are very important for the growth and development of plants. Ca is an essential element required by plants at high concentrations; while Si is a beneficial element, capable of assigning greater protection to plants against the attack of pests and diseases, in addition to improving soil conditions, promoting a better development of plants. Additionally, it is also known that Si contributes to reducing phosphorus adsorption in the soil, what may lead to an increased efficiency of phosphate fertilization. When applied to soil, AgroSiCa contributes to the supply of nutrients, may provide better root growth in surface and subsurface of soils, and improves the plants development.

Another element of AgroSiCa is fluoride (F), as phosphate rocks typically present 1% to 4% fluoride content in their mineral constitution. Fluoride is known as one of the elements of the periodic table with highest electronegativity and reactivity and, therefore, such element is not naturally found in nature in its free form. Fluoride is typically found combined to other elements. Thus, after the AgroSiCa application in soils, the element F combines with other mineral compounds present in soil. Therefore, the F content in the product is dissociated as fluoride (F) and may indirectly result in higher phosphate ($H_2PO_4^-$) availability to plants. This may occur due to the occupation of part of the adsorption sites by $F^-$ and to its affinity with aluminum, forming $AlF_2^+$, $AlF^{2+}$, and $AlF_3$, thence avoiding the formation of a phosphate precipitate ($AlPO_4$). Therefore, the fluoride prevents the adsorption of phosphate in the soil and contributes to higher phosphate availability to plants. Additionally, the combined forms of Al—F present lower activity than those of the $Al^{3+}$ in solution, making the same less phytotoxic to plants. The presence of F and Si, combined with their alkalinity, helps to improve the efficiency of phosphate fertilization due to increase of soil pH, generation of negative charges, occupation of phosphate-binding sites by fluoride and silicate, and also due to the neutralization of the aluminum in the soil, reducing its toxic effect in plants. Consequently, there is a higher growth and development of plants, evidencing its agricultural potential.

The use of AgroSiCa as a soil conditioner can also reduce the toxic effect of trace elements, like manganese, for example. Literature reports that the presence of silicon in the leaves of the plants can reduce the toxicity of the element manganese, providing a more uniform distribution of such element in the structure of the plants. Therefore, the silicon can avoid the manganese accumulation points that may injure the plants leaves. Also, higher water use efficiency by plants has been attributed to silicon due to its restricting role in evapotranspiration losses.

Note further that the silicon also allows AgroSiCa to increase its alkalinity potential. The soil pH is increased by the formation of silicic acid ($H_4SiO_4$), which although considered an acid, behaves like a base, as it dissociates at high pH ($pK_1$=9.71). Because it is a weak acid, when it is added to tropical soils, which are mostly acid, the $H_4SiO_4$ promotes water hydrolysis, releasing hydroxyl in the solution, therefore contributing to pH increase.

Due to its properties that are favorable to plant growth, which is characterized by increase of soil pH and the nutrients levels, decrease in Al phytotoxicity, and increase in phosphate fertilization efficiency, AgroSiCa can be employed in different soil management situations.

Another secondary effect of the AgroSiCa utilization is the provision of a larger organic carbon contribution to the soil, arising from a higher growth of plants allowed by the presence of nutrients in the product. Such higher carbon contribution in the substrate, in turn, may allow the cultivation of phytoextracting, phytomining, or phytostabilizing species.

The presence of nutrients in AgroSiCa may also contribute to increase of Ca levels in the subsurface horizon of the soil. Brazilian soils are generally poor in Ca in both surface and subsurface, and the main function of the Ca is to contribute to the root growth, mainly at deeper layers of the soil. Therefore, the product presents a surface and subsurface function, and may contribute to further deepen the root system of the plants, increase nutrient cycling, better use of water, and lower nutrient leaching losses.

AgroSiCa Laboratory-Scale Production and Pilot Plant

The production of AgroSiCa for use in agronomic trials has been performed, in the first step, in a laboratory bench system, via $H_2SiF_6$ neutralization with CaO. In this step, two sources of $H_2SiF_6$ were evaluated separately, the first from an industrial complex located in Cubatão, and the second from Uberaba, originating two products, AgroSiCa 1 and AgroSiCa 2, respectively (see FIG. 2).

Subsequently, AgroSiCa has been produced in a pilot plant, where the proportions of $H_2SiF_6$ and CaO were evaluated to obtain a product with appropriate consistency and pH. The pilot plant consisted of an open, Kullman type reactor, with stirrer provided with mechanically adjusted rotation control. The reactor, after a residence time, discharges into a conveyor belt at variable speed allowing retention times from 6 to 10 minutes. A hopper with conveyor belt was used for metering the CaO. The dose was volumetric and the adjustment was made through regulating the height of a gate. The $H_2SiF_6$ was fed using a peristaltic pump, which can ensure an accurate metering.

Agronomical and Environmental Evaluation of AgroSiCa

In order to evaluate the agronomical and environmental potential of AgroSiCa, three different types of soil have been collected, with different contents of clay and Al concentrations. Such soils have been dried, sieved, and characterized both chemically and physically (see table 1), and were utilized for the cultivation of maize and soybean.

TABLE 1

Shows the physical and chemical properties of the three soils used for maize and soybean cultivation that received the AgroSiCa doses.

| Characteristics | Red Latosol | | Red-Yellow Latosol | | Cambisol | |
|---|---|---|---|---|---|---|
| | 0-20 cm | 20-40 cm | 0-20 cm | 20-40 cm | 0-20 cm | 20-40 cm |
| pH in water | 5.2 | 5.0 | 5.1 | 5.2 | 5.1 | 5.2 |
| P (mg $dm^{-3}$) | 0.84 | 0.56 | 0.56 | 0.28 | 0.56 | 0.56 |
| $K^+$ (mg $dm^{-3}$) | 36.0 | 27.0 | 8.0 | 6.0 | 15.6 | 9.4 |
| $Ca^{2+}$ ($cmol_c$ $dm^{-3}$) | 0.55 | 0.15 | 0.60 | 0.50 | 0.20 | 0.10 |
| $Mg^{2+}$ ($cmol_c$ $dm^{-3}$) | 0.25 | 0.10 | 0.10 | 0.10 | 0.10 | 0.10 |

TABLE 1-continued

Shows the physical and chemical properties of the three soils used for maize and soybean cultivation that received the AgroSiCa doses.

| Characteristics | Red Latosol | | Red-Yellow Latosol | | Cambisol | |
|---|---|---|---|---|---|---|
| | 0-20 cm | 20-40 cm | 0-20 cm | 20-40 cm | 0-20 cm | 20-40 cm |
| $Al^{3+}$ ($cmol_c\, dm^{-3}$) | 0.50 | 0.50 | 0.10 | 0.10 | 0.80 | 0.80 |
| H + Al ($cmol_c\, dm^{-3}$) | 3.83 | 2.90 | 3.24 | 3.43 | 6.30 | 6.40 |
| Exchangeable bases ($cmol_c\, dm^{-3}$) | 0.89 | 0.32 | 0.73 | 0.72 | 0.40 | 0.20 |
| ($CEC_{effective}$) ($cmol_c\, dm^{-3}$) | 1.39 | 0.82 | 0.83 | 0.72 | 1.20 | 1.00 |
| Al saturation (%) | 36.8 | 61.3 | 12.2 | 14.1 | 66.7 | 80.0 |
| $CEC_{total}$ ($cmol_c\, dm^{-3}$) | 4.72 | 3.22 | 3.97 | 4.05 | 6.70 | 6.60 |
| Base saturation (%) | 18.9 | 9.88 | 18.2 | 15.2 | 6.00 | 3.00 |
| OM (g $dm^{-3}$) | 2.48 | 1.41 | 2.30 | 2.11 | 1.60 | 1.30 |
| S (mg $dm^{-3}$) | 4.93 | 2.63 | 6.83 | 5.68 | — | — |
| B (mg $dm^{-3}$) | 0.36 | 0.14 | 0.24 | 0.21 | — | — |
| Sand (g $kg^{-1}$) | 710 | 690 | 190 | 190 | 530 | 530 |
| Silt (g $kg^{-1}$) | 40 | 40 | 100 | 90 | 180 | 180 |
| Clay (g $kg^{-1}$) | 250 | 270 | 710 | 720 | 290 | 290 |

After the soil preparation step, the soils have been placed in lysimeters, which were manufactured with PVC pipes and PET bottles and used for the maize cultivation, and in pots for the soybean cultivation. After the soils were allocated to such containers, they were limed, and then the doses of AgroSiCa were applied.

The AgroSiCa (hereinafter referred to as AgroSiCa 2) originated from the hexafluorosilicic acid ($H_2SiF_6$) produced by the Uberaba industrial complex plant was chosen for the application in the soils and plant evaluations, considering the repeatability of the industrial process and larger amount of the waste ($H_2SiF_6$) produced at the industrial plant in the municipality.

AgroSiCa was applied in the following doses: 0; 0.5, 0.1; 0.2, and 0.4 t $ha^{-1}$. The 0.5 and 0.1 t $ha^{-1}$ doses of AgroSiCa represented the Si agronomical recommendation for crops. The 0.1 t $ha^{-1}$ dose can contribute to approximately 100 kg of Si $ha^{-1}$. Additionally, this dose may add approximately 200 kg $ha^{-1}$ of Ca to soil, or approximately 1.0 $cmol_c$ of Ca per $dm^3$ of soil at the 0-20 cm layer, which represents a significant increase of Ca in the soils and also to crops. The maximum dose to be applied (4 t $ha^{-1}$) adds 600 kg of fluoride per hectare, or 300 mg of F $kg^{-1}$ of soil. This represents the average overall concentration of F in the soils.

Due to the low neutralization power of AgroSiCa (see table 3), each soil had its pH corrected before the introduction of AgroSiCa, with the application of limestone containing 35% CaO, 14% MgO, and PRNT=100%. After the application, a 30-day term was established for incubation in pots and soil columns. During the period, the columns and pots were kept with moisture close to 50% of field capacity to ensure the limestone neutralization reactions. After 30 days, AgroSiCa was applied, and then 40-day incubation period was established. After that, a factorial of 5×3×2×3 was used for the maize and soybean, consisting of 5 doses of AgroSiCa, 3 types of soils, 2 doses of phosphorus (2× and 4× the clay content) with 3 repetitions, totalizing 90 experimental plots for each crop.

Fertilization and planting were carried out for both crops and, subsequently, maize was sown in the lysimeters and soybean was sown in pots, being thinned down to one seedling per cultivation container, one week after emergence. Maize was cultivated for 60 days, and soybean remained under AgroSiCa doses for 45 days. The data obtained was submitted to analysis of variance and polynomial regression.

The Main Results and Interpretation of Data

AgroSiCa Production:

At bench scale, two hexafluorosilicic acids obtained from two industrial facilities (Cubatão and Uberaba) were separately neutralized with calcium oxide, originating the AgroSiCa 1 and AgroSiCa 2, respectively (see FIG. 2).

Subsequently, AgroSiCa was also produced in a pilot plant (see FIG. 3), where the proportions of $H_2SiF_6$ and CaO were evaluated, in order to obtain a product with appropriate consistency and pH. In this step of the production, an open, Kullman type reactor, with mechanically adjusted rotation control stirrer was used. The reactor was fed with $H_2SiF_6$ through a peristaltic pump and with CaO through a hopper provided with metering conveyor belt. The production test at the pilot plant showed that it is possible to obtain AgroSiCa at industrial scale with appropriate characteristics for handling and application to soils. It was found that the specific consumption of $H_2SiF_6$ and CaO, as well as the moisture of the AgroSiCa produced at the pilot plant were similar to those obtained at the laboratory bench. Table 2 below summarizes such values.

TABLE 2

Shows AgroSiCa balance of masses and production factors in laboratory bench system and in the pilot plant
Calculation of AgroSiCa production factors
Consumption in kg/t

| Origin/Condition | Laboratory Bench | Pilot Plant |
|---|---|---|
| $H_2SiF_6$ | Close to 1000 | Close to 1000 |
| CaO | Close to 340 | Close to 340 |
| Moisture | Close to 40% | Close to 40% |
| Conc. $H_2SiF_6$ | Close to 24% | Close to 24% |
| CaO/$H_2SiF_6$ (100%) ratio | Close to 1.40 | Close to 1.40 |

AgroSiCa Characterization:

The AgroSiCa 1 and AgroSiCa 2 produced at bench scale presented pH values close to 10 and moisture below 40%. Total phosphorus ($P_2O_5$) concentration from 0.2 to 3.0%; in citric acid between 0.2 and 3.0; in neutral ammonium citrate (NAC)+water, between 0.1 and 2.0%; and, in water, below 1% (see table 3).

TABLE 3

Chemical characterization of AgroSiCa 1 and AgroSiCa 2

| Property | AgroSiCa 1 | AgroSiCa 2 |
|---|---|---|
| pH in water | 10.46 ± 0.15 | 10.23 ± 0.20 |
| Moisture | 35% ± 2.45 | 33% ± 2.80 |
| $P_2O_5$ - total (%) | 2.48 ± 0.15 | 0.23 ± 0.02 |
| $P_2O_5$ - water | <LQ | <LQ |
| $P_2O_5$ - NAC + water (%) | 1.47 ± 0.07 | 0.17 ± 0.01 |
| $P_2O_5$ - citric acid (%) | 2.48 ± 0.02 | 0.26 ± 0.01 |
| Ca (%) | 20.02 ± 0.7 | 22.06 ± 0.32 |
| Mg (%) | 0.49 ± 0.07 | 0.48 ± 0.04 |
| Total Si (%) | 10.04 | 9.08 |
| Soluble Si (%) | 3.18 | 3.57 |
| NP (neutralizing power) (%) | 6.74 ± 1.40 | 11.52 ± 0.5 |
| TNP (total neutralizing power) (%) | 6.71 ± 1.49 | 9.53 ± 1.55 |
| Fluoride - HCl (%) | 14.79 ± 0.67 | 17.56 ± 0.86 |
| Fluoride - NAC (%) | 0.21 ± 0.05 | 0.31 ± 0.11 |
| Fluoride - water (%) | 0.029 ± 0.0 | 0.027 ± 0.003 |
| Fluoride - citric acid (%) | 0.26 ± 0.03 | 0.25 ± 0.14 |

LQ = limit of quantification ($P_2O_5$ water) = 0.06 mg $kg^{-1}$

With respect to calcium, the product presented concentrations between 20% and 25%, and magnesium concentrations are between 0.4% and 0.6%. As regards total silicon concentration, AgroSiCa presents values between 8% and 12%, with water-soluble silicon representing between 30% and 40% of total Si. Fluoride concentrations in hydrochloric acid between 15% and 20%; in citric acid and in neutral ammonium citrate, between 0.2% and 0.5%; and in water, between 0.02% and 0.05%; AgroSiCa presents neutralization power between 5% and 15%, and a total neutralization power between 5% and 12%.

In general, AgroSiCa 1 and AgroSiCa 2 presented similar pH, moisture, and total and soluble Ca, Mg, and Si values. The major variation between the products produced was found for the neutralization capability, fluoride concentration, and total $P_2O_5$ content.

The result of X-ray diffraction confirms the prevalence of mineral fluorite ($CaF_2$) as a main component of the solid phase of AgroSiCa (see FIG. 4), with peaks of such mineral being identified at 3.153 Å (94 intensity), 1.931 Å (100 intensity), and lower intensity peaks at 1.647 Å (35 intensity), 1.366 Å (12), 1.253 Å (10), and 1.1150 Å (16).

Results from the Application of AgroSiCa in Soil and Influence on Maize and Soybean Growth In order to evaluate the influence of AgroSiCa as a neutralizer of soil acidity, the pH of the three soils was evaluated following the application of doses of the product, which was compared to limestone under the same conditions. It was verified that the application of AgroSiCa promoted lower increment on soil pH when compared with limestone (see FIG. 5). In Cambisol, AgroSiCa increased the soil pH from 4.30 to 5.22. Red-Yellow Latosol increased from 4.33 to 4.98, while Red Latosol varied from 4.89 to 5.59. The increase of soil pH after the AgroSiCa application was due to fact that it showed 9% of Si-total (30% to 40% being water-soluble) and the silicate anion hydrolysis promoted the release of hydroxyl, neutralizing H+ and raising the soil pH. This was due the displacement of OH from the adsorption of clay or Al—OH species by fluoride. Moreover, the increase of soil pH was due both to the basic character of the AgroSiCa and the liberation of OH— from oxides and hydroxides of Fe and Al (mainly those of low crystallization degree) and also the surface of clay minerals due the fluoride adsorption.

It was verified that AgroSiCa led to a significant increase on levels of phosphorus, calcium, and silicon in the soil solution, before the cultivation of maize and soybean (see FIG. 6a, b, and c). This result is favorable to the product, because it allowed greater nutrients availability for growing of maize and soybean. The increase of phosphorus concentration may be related to the fact that the product formed after the neutralization reaction of hexafluorosilicic acid with calcium oxide presented in their chemical composition 9% of Si-total (30% to 40% being water-soluble). It is well established that the phosphate ($H_2PO_4^-$) and silicate ($H_3SiO_4^-$) ions are adsorbed by the iron and aluminium oxides of the clay fraction, with silicate being able to dislocate the previously adsorbed phosphate, from the oxidic surfaces. The adsorption speed of Si in oxidic soils is high, and it is, therefore, predicted that large amounts of Si in the chemical composition of product obtained after the neutralization reaction of hexafluorosilicic acid with calcium oxide can be adsorbed, minimizing the phosphorus fixation. The results found evidence that AgroSiCa may act as a potentiator of phosphate fertilizer, enhancing the efficiency of phosphorus application and the uptake by plants. Experiments with maize and soybean evidenced the premise, where the increase of phosphorus levels in shoot for both crops was observed. The results are discussed below.

The levels of calcium and silicon in the soil solutions were progressively increased (see FIG. 6b e c). These increases are related to the chemical composition of the AgroSiCa, since the applied product has 22% of calcium and 9% of silicon (30% to 40% being water-soluble). The increased concentration of Si in soil indicates that the source of Si used is reactive and very effective in providing Si in the soil, contributing to increase of phosphorus availability in the soils, as previously mentioned. The increased availability of this element in soils, may have contributed to the better growth of maize and soybeans plants.

With respect to the fluoride concentration in the leachate, after the cultivation of the plants, a slight increase in the element was noticed in the three soils used (see FIG. 6d). This result is also extremely favorable to AgroSiCa, because, in Cambisol and Red-Yellow Latosol, where there would be more concern as to a possible high fluoride concentration, the values found were below 0.6 mg $L^{-1}$, a value much lower than 10 mg $L^{-1}$, which is stipulated under Brazilian resolution CONAMA 430, of 2011 for effluent release. The values found in the present invention are also inferior to those established by the World Health Organization for potable water, which may provide the fluoride limit of 1.5 mg $L^{-1}$.

The application of AgroSiCa significantly reduced the labile aluminum levels in all soils, after the cultivation of both maize and soybean (see FIGS. 7 and 8), this effect being more pronounced for layers at 0-10 and 10-20 cm depths for the maize cultivation, and for the Cambisol after the soybean cultivation. Literature reports that fluoride can reduce aluminum toxicity in the soil, as the fluoride reacts with the free aluminum in the soil solution, forming ion pairs, which reduce the aluminum toxicity to plants. In the present study, the application of AgroSiCa evidences the reduction of Al contents in the soil, at both surface and subsurface. This result reveals the potential for the agricultural use of AgroSiCa, its benefit being not dependant on the type of soil.

As a consequence of the reduction of aluminum and increased nutrients availability in the soils, as reported above, the application of AgroSiCa progressively increased the shoot yield for both crops (see FIGS. 9 and 10), and the effect being more pronounced in Cambisol, which had the highest Al level in its chemical composition. The content of nutrients (P, Ca, and Si) in the dry matter of both crops increased significantly with AgroSiCa doses (see table 4). Additionally, the positive correlations between the nutrients levels in the soils and growth of maize and soybean (0.97 and 0.98 for maize and soybean, respectively, p<0.05), and between the nutrient content in soils and the nutrients levels in shoot of both crops (0.98 and 0.96 for maize and soybean, respectively, p<0.05) were observed, which reinforces the hypothesis that AgroSiCa was responsible for the greater growth of both crops. The absorption of F by maize and soybean plants increased (see table 4), although not reaching toxic concentrations in the plants, which did not lead to nutritional unbalances, and neither compromised the growth of the crops.

TABLE 4

Shows the contents of phosphorus, calcium, silicon, and fluoride in leaves of maize and soybean after cultivation with AgroSiCa doses

| Doses (t/ha) | Ca | P (g/kg) | Si | F (mg/kg) |
|---|---|---|---|---|
| *Cambisol* | | | | |
| *Corn* | | | | |
| 0 | 1.67 ± 0.04 | 1.81 ± 0.11 | 2.71 ± 0.28 | 30.90 ± 2.82 |
| 0.5 | 1.96 ± 0.31 | 1.99 ± 0.12 | 2.26 ± 0.26 | 46.05 ± 3.19 |
| 1.0 | 2.43 ± 0.11 | 2.10 ± 0.13 | 2.53 ± 0.30 | 59.00 ± 2.18 |
| 2.0 | 3.46 ± 0.24 | 2.55 ± 0.18 | 3.0 ± 0.30 | 72.00 ± 3.85 |
| 4.0 | 3.63 ± 0.28 | 2.70 ± 0.10 | 3.66 ± 0.23 | 98.00 ± 7.80 |
| *Soybean* | | | | |
| 0 | 3.07 ± 0.90 | 1.10 ± 0.16 | 0.70 ± 0.28 | 1.47 ± 0.90 |
| 0.5 | 3.45 ± 0.38 | 1.21 ± 0.09 | 0.98 ± 0.26 | 1.58 ± 1.20 |
| 1.0 | 3.95 ± 0.54 | 1.27 ± 0.04 | 1.66 ± 0.30 | 6.11 ± 2.11 |
| 2.0 | 4.89 ± 0.78 | 1.30 ± 0.07 | 2.32 ± 0.30 | 8.67 ± 1.87 |
| 4.0 | 5.71 ± 0.44 | 1.46 ± 0.05 | 3.01 ± 0.43 | 9.34 ± 1.13 |
| *Red-Yellow Latossol* | | | | |
| *Corn* | | | | |
| 0 | 3.00 ± 0.33 | 1.81 ± 0.05 | 2.81 ± 0.42 | 49.11 ± 3.11 |
| 0.5 | 3.56 ± 0.36 | 1.92 ± 0.08 | 2.43 ± 0.27 | 53.65 ± 3.53 |
| 1.0 | 3.76 ± 0.62 | 2.00 ± 0.10 | 2.55 ± 0.12 | 57.00 ± 3.4 |
| 2.0 | 3.86 ± 0.42 | 2.10 ± 0.12 | 2.75 ± 0.47 | 64.00 ± 3.33 |
| 4.0 | 4.30 ± 0.06 | 2.20 ± 0.06 | 3.12 ± 0.32 | 80.00 ± 8.11 |
| *Soybean* | | | | |
| 0 | 4.51 ± 0.51 | 1.09 ± 0.06 | 0.90 ± 0.45 | 2.24 ± 0.84 |
| 0.5 | 5.47 ± 0.15 | 1.23 ± 0.03 | 1.20 ± 0.32 | 3.13 ± 1.31 |
| 1.0 | 6.59 ± 1.14 | 1.32 ± 0 05 | 1.30 ± 0.12 | 3.49 ± 1.38 |
| 2.0 | 7.98 ± 0.76 | 1.35 ± 0.06 | 1.80 ± 0.23 | 3.84 ± 1.67 |
| 4.0 | 9.32 ± 0.65 | 1.40 ± 0.09 | 2.43 ± 0.44 | 4.74 ± 0.56 |
| *Red Latossol* | | | | |
| *Corn* | | | | |
| 0 | 2.53 ± 0.44 | 1.05 ± 0.05 | 2.78 ± 0.48 | 49.46 ± 2.90 |
| 0.5 | 2.83 ± 0.29 | 1 12 ± 0.18 | 2.23 ± 0.24 | 50.41 ± 4.00 |
| 1.0 | 2.70 ± 0.37 | 1.25 ± 0.15 | 2.35 ± 0.31 | 47.36 ± 2.54 |
| 2.0 | 3.27 ± 0.22 | 1.25 ± 0.15 | 1.95 ± 0.35 | 49.45 ± 3.23 |
| 4.0 | 3.07 ± 0.28 | 1.63 ± 0.18 | 2.43 ± 0.24 | 47.36 ± 0.86 |
| *Soybean* | | | | |
| 0 | 2.99 ± 0.93 | 0.97 ± 0.06 | 0.50 ± 0.03 | 0.03 ± 0.09 |
| 0.5 | 4.41 ± 0.79 | 1.00 ± 0.05 | 0.80 ± 0.12 | 0.04 ± 0.01 |
| 1.0 | 4.42 ± 0.72 | 1.11 ± 0.04 | 1.30 ± 0.31 | 0.17 ± 0.09 |
| 2.0 | 5.51 ± 1.11 | 1.14 ± 0.04 | 1.70 ± 0.35 | 0.21 ± 0.12 |
| 4.0 | 6.33 ± 0.72 | 1.19 ± 0.03 | 1.82 ± 0.24 | 0.89 ± 0.15 |

After describing a few examples of preferred materialization examples of the invention, it is worth reinforcing that the scope of protection granted by the present document encompasses any other alternative forms pertinent to the execution of the invention, this being only defined and limited by the content of the enclosed table of claims.

The invention claimed is:

1. A method of conditioning soil, comprising:
   neutralizing hexafluorosilicic acid ($H_2SiF_6$) with calcium oxide (CaO) to obtain a neutralized product; and
   applying the neutralized product to soil.

2. The method in accordance with claim 1, wherein the neutralized product comprises nutrients for plants and soil microorganisms.

3. The method in accordance with claim 1, wherein the neutralized product increases soil pH by increasing negative charges.

4. The method in accordance with claim 1, wherein the neutralized product enhances efficiency of phosphate fertilization.

5. The method in accordance with claim 1, wherein the neutralized product enhances development or growth of roots.

6. The method in accordance with claim 2, wherein the nutrients are selected from the group consisting of phosphorus, calcium, magnesium, and zinc.

7. The method in accordance with claim 1, wherein the neutralized product comprises silicon.

8. The method in accordance with claim 1, wherein the neutralized product decreases aluminum toxicity in a surface and a subsurface of the soil.

9. The method in accordance with claim 1, wherein the neutralized product enhances development or growth of roots in a subsurface of the soil.

10. The method in accordance with claim 1, wherein the neutralized product reduces adsorption of phosphorus in the soil by occupying phosphate-binding sites with silicate and fluoride.

11. The method in accordance with claim 1, wherein the neutralized product increases uptake of water and nutrients by plants.

12. The method in accordance with claim 1, wherein the neutralized product increases crop production.

* * * * *